Figure 1:
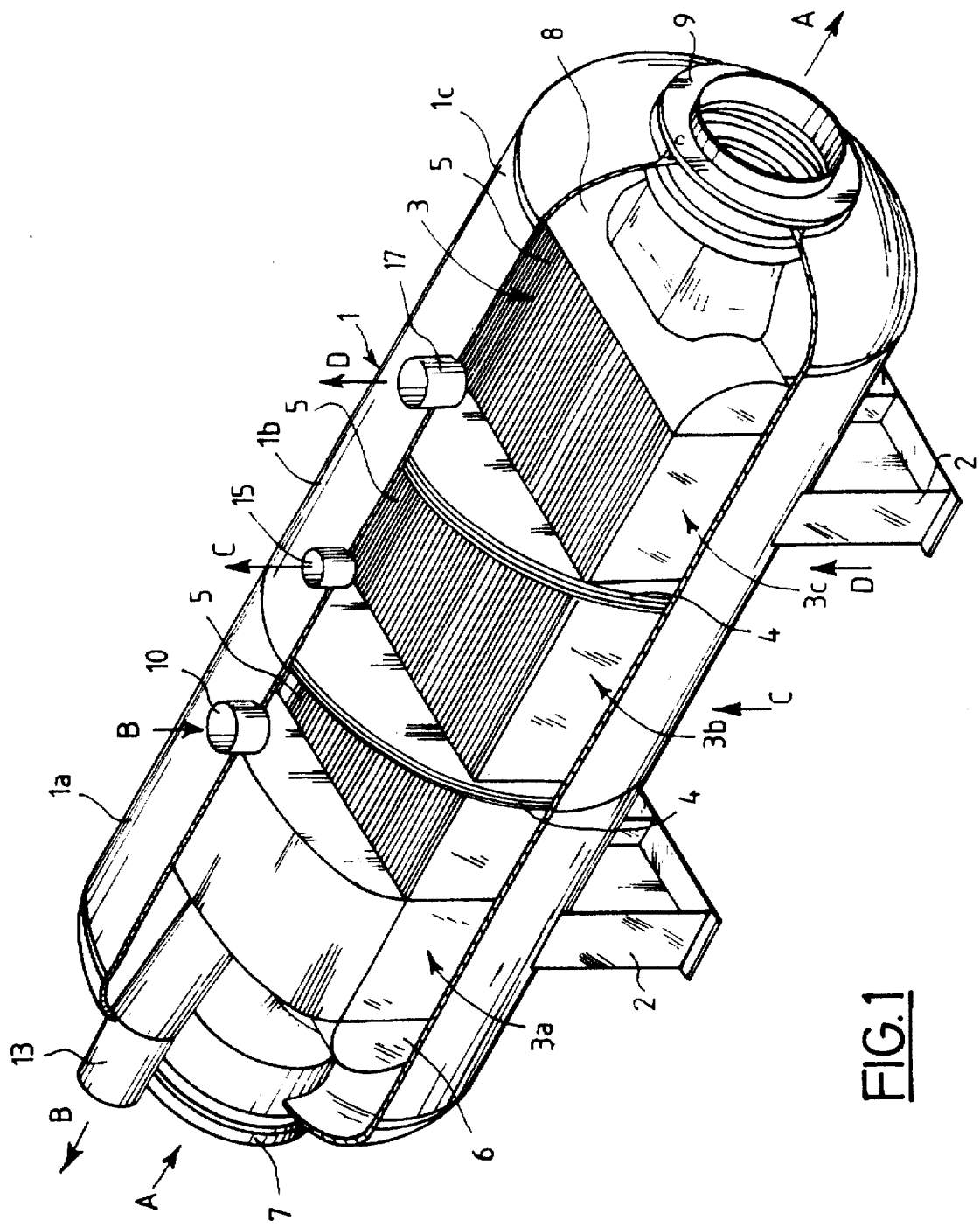

United States Patent [19]
da Costa et al.

[11] Patent Number: 5,755,280
[45] Date of Patent: May 26, 1998

[54] PLATE-TYPE HEAT EXCHANGER

[75] Inventors: Carlos da Costa, Paris; Dominique Sabin, Herbeville; Gabriel Merle, Chalon-sur-Saone, all of France

[73] Assignee: Packinox, Paris la Defense, France

[21] Appl. No.: 642,547

[22] Filed: May 3, 1996

[30] Foreign Application Priority Data

May 4, 1995 [FR] France ................. 95 05350

[51] Int. Cl.[6] ........................................... F28D 1/03
[52] U.S. Cl. ................. 165/140; 165/157; 165/159; 165/166
[58] Field of Search .................. 165/140, 157, 165/159, 161, 166

[56] References Cited

U.S. PATENT DOCUMENTS

| | | | |
|---|---|---|---|
| 2,566,310 | 9/1951 | Burns et al. | 165/166 X |
| 2,617,634 | 11/1952 | Jendrassik | 165/166 X |
| 2,650,073 | 8/1953 | Holm | 165/140 |
| 2,846,198 | 8/1958 | Sturges | 165/166 X |
| 3,537,513 | 11/1970 | Austin et al. | 165/70 |
| 3,587,731 | 6/1971 | Hays | 165/140 |
| 4,330,308 | 5/1982 | Grenier et al. | 165/140 X |

FOREIGN PATENT DOCUMENTS

| | | |
|---|---|---|
| 0 196 589 A3 | 10/1986 | European Pat. Off. |
| 2 471 569 | 6/1981 | France . |
| 2 052 722 | 1/1981 | United Kingdom . |

*Primary Examiner*—Allen J. Flanigan
*Attorney, Agent, or Firm*—Pollock, Vande Sande & Priddy

[57] ABSTRACT

The subject of the invention is a plate-type heat exchanger including a leaktight vessel (1) of elongate shape divided transversely into at least two independent segments and a plate bundle (3) arranged in the leaktight vessel (1) and formed by a stack of metal plates which are equipped with corrugations defining gaps between them. One gap in two forms a longitudinal main circuit for a first fluid A stretching along the entire length of the plate bundle (3), and the other gaps are divided transversely in order to form at least two secondary and independent circuits for the circulation of a second fluid B and at least one third fluid C and D perpendicular to the direction of circulation of the first fluid A.

21 Claims, 6 Drawing Sheets

PLATE-TYPE HEAT EXCHANGER

The subject of the present invention is a plate-type heat exchanger for fluids and, in particular, a plate-type heat exchanger used for cooling or heating a first fluid by heat exchange with at least one second fluid.

Heat exchangers are usually of two types.

The first type of heat exchanger has a bundle of U-shaped tubes or a bundle of straight tubes through which one of the fluids circulates.

However, this type of exchanger is of an expensive design and the thermal efficiency thereof is limited, bearing in mind that the number of tubes depends on the space available which, in most cases, is restricted.

The second type of heat exchanger has a leaktight vessel in which there is placed a bundle of plates arranged contiguously and parallel to one another.

The plates, which consist of thin sheet, usually made of stainless steel, have edges with smooth surfaces and a central part equipped with corrugations via which they are in contact with one another and via which they delimit channels forming circuits for the circulation of independent fluids.

This type of heat exchanger with plate bundles operates with various fluids, such as liquids or gases or a two-phase mixture for example.

With this type of plate-type exchanger, by making the two fluids circulate through the respective circuits, heat exchange takes place between these two fluids which makes it possible to heat one of the fluids and cool the other fluid, or vice versa.

For certain industrial applications it is necessary to obtain a substantial temperature difference of the fluid to be heated or to be cooled between its inlet and its outlet in the plate-type exchanger.

This is why several plate-type exchangers are, in this case, placed one after the other.

Each plate-type heat exchanger consists of a leaktight vessel in which there is arranged a plate bundle delimiting two circuits, one of which is intended for the main fluid to be heated or cooled.

These main circuits of the various plate bundles are joined together by connecting pipes which pass in leaktight fashion through each vessel so as to achieve a continuous circulation of the main fluid through the various plate bundles.

The result of this is that the ground area necessary for this sort of installation is high, and the cost of manufacturing and maintaining it is also high.

In addition, the connecting pipes between the various exchangers for transferring the main fluid between these exchangers constitute regions of needless and parasitic head losses.

The object of the invention is to avoid the aforementioned drawbacks by providing a compact plate-type heat exchanger which makes it possible to reduce the head losses together with the weight and bulk of the installation equipped with such a plate-type heat exchanger and to control accurately the temperature of the main fluid to be heated or cooled.

The subject of the invention is therefore a plate-type heat exchanger, characterized in that it includes:

- a leaktight vessel of elongate shape, and divided transversely into at least two independent segments,
- and a plate bundle arranged in the leaktight vessel and formed by a stack of metal heat-exchange plates which are equipped with corrugations and define gaps between them, one gap in two forming a longitudinal main circuit for a first fluid stretching along the entire length of the plate bundle, and the other gaps being divided transversely in the plane of division of the leaktight vessel in order to form at least two secondary and independent circuits for the circulation of a second fluid and at least one third fluid perpendicular to the direction of circulation of the first fluid.

According to other features of the invention:

- the leaktight vessel is divided transversely by at least one partition arranged between the internal wall of the said vessel and the external walls of the plate bundle,
- the main circuit is joined at one end of the plate bundle to means for letting in the first fluid A and at the opposite end of the said plate bundle to means for letting the said first fluid out after it has passed through the main circuit,
- at least one secondary circuit is divided in order to form two sub-circuits for circulation of the corresponding fluid in opposite directions,
- the secondary circuits are separated from one another by I-shaped section pieces stretching substantially along the entire width of the plate bundle and having a vertical web and two horizontal and parallel flanges welded to the transverse edges of the plates of the bundle forming the said secondary circuits,
- each plate of the bundle has, at the gaps defining the main circuit and on each of its longitudinal edges, a longitudinal fold arranged facing the fold of the adjacent plate, the said longitudinal folds stretching substantially along the entire width of each secondary circuit and the free edges of these folds being joined together by a leaktight linear weld,
- the free ends of the folds are joined to the adjacent end of the section pieces by a connecting piece,
- each plate of the bundle has, at the gaps defining a secondary circuit and on its transverse edges situated at the end of the plate bundle, a transverse fold arranged facing the fold of the adjacent plate, the free edges of these folds being joined together by a leaktight linear weld,
- the corners of the plates at the ends of the plate bundle are joined together by a connecting corner piece.

Figure 2:
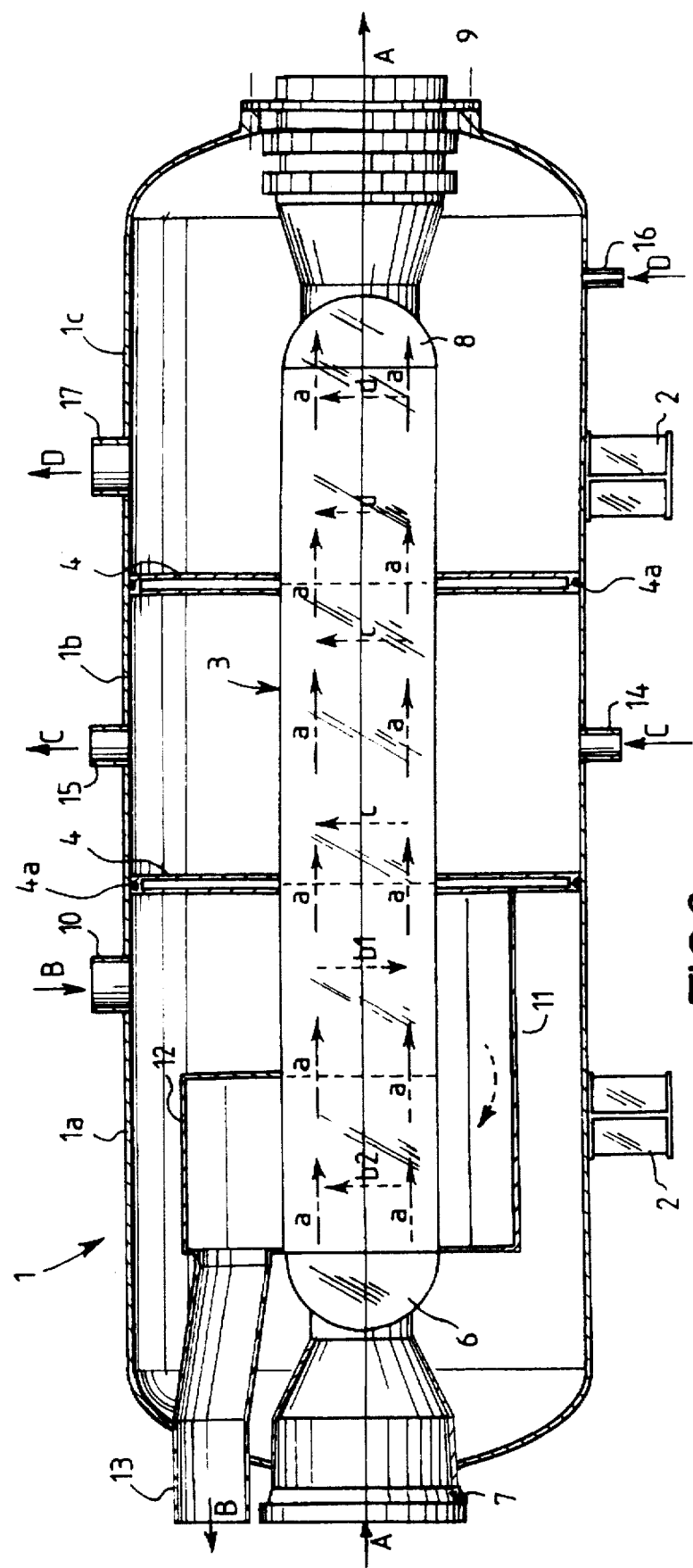
Figure 3:
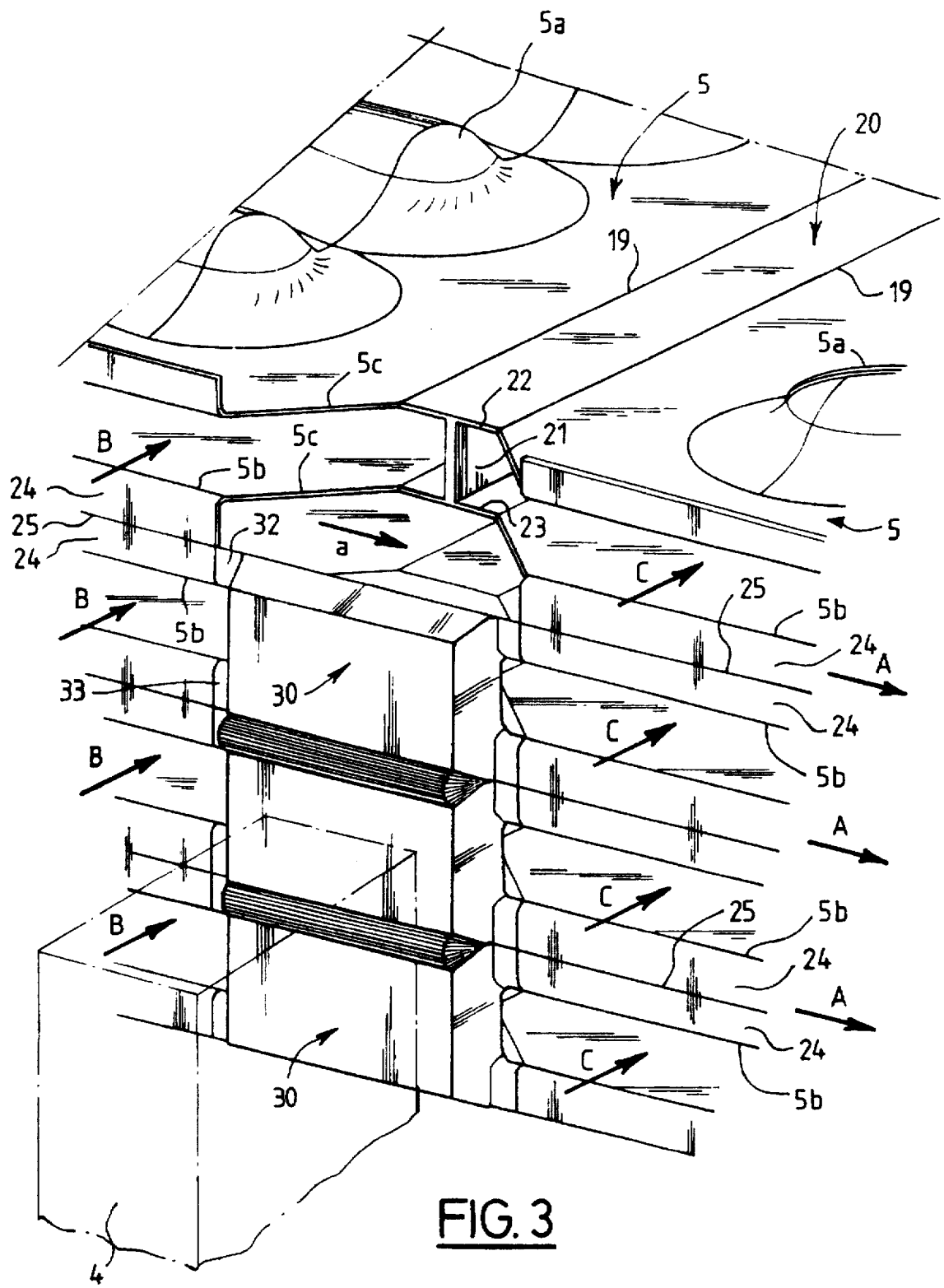
Figure 4:
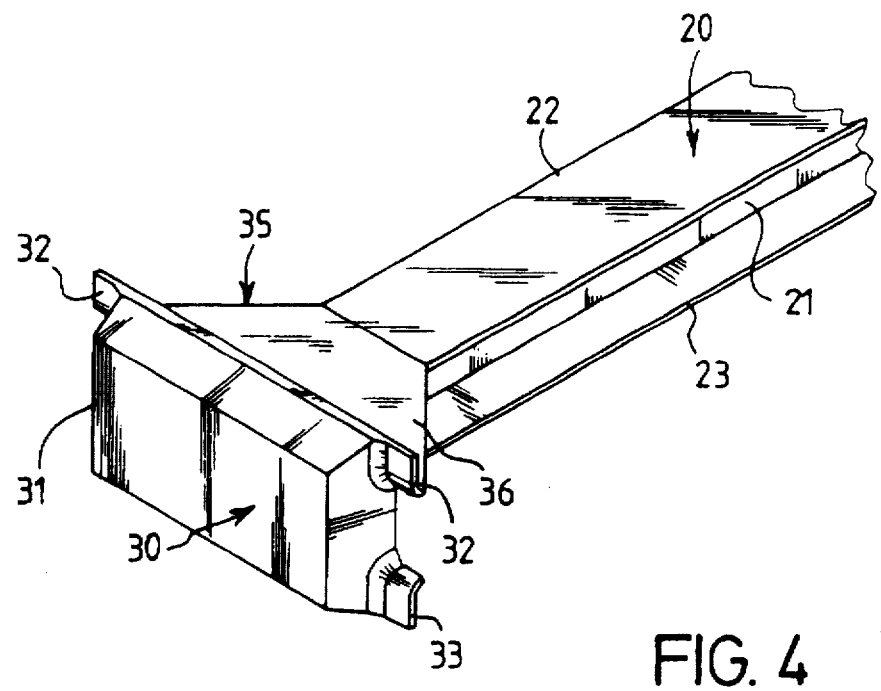
Figure 5:
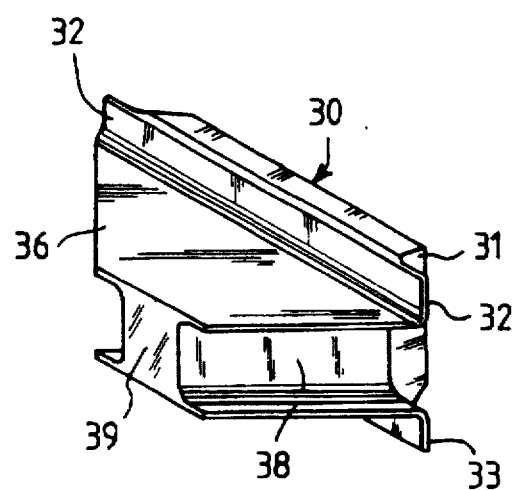
Figure 6:
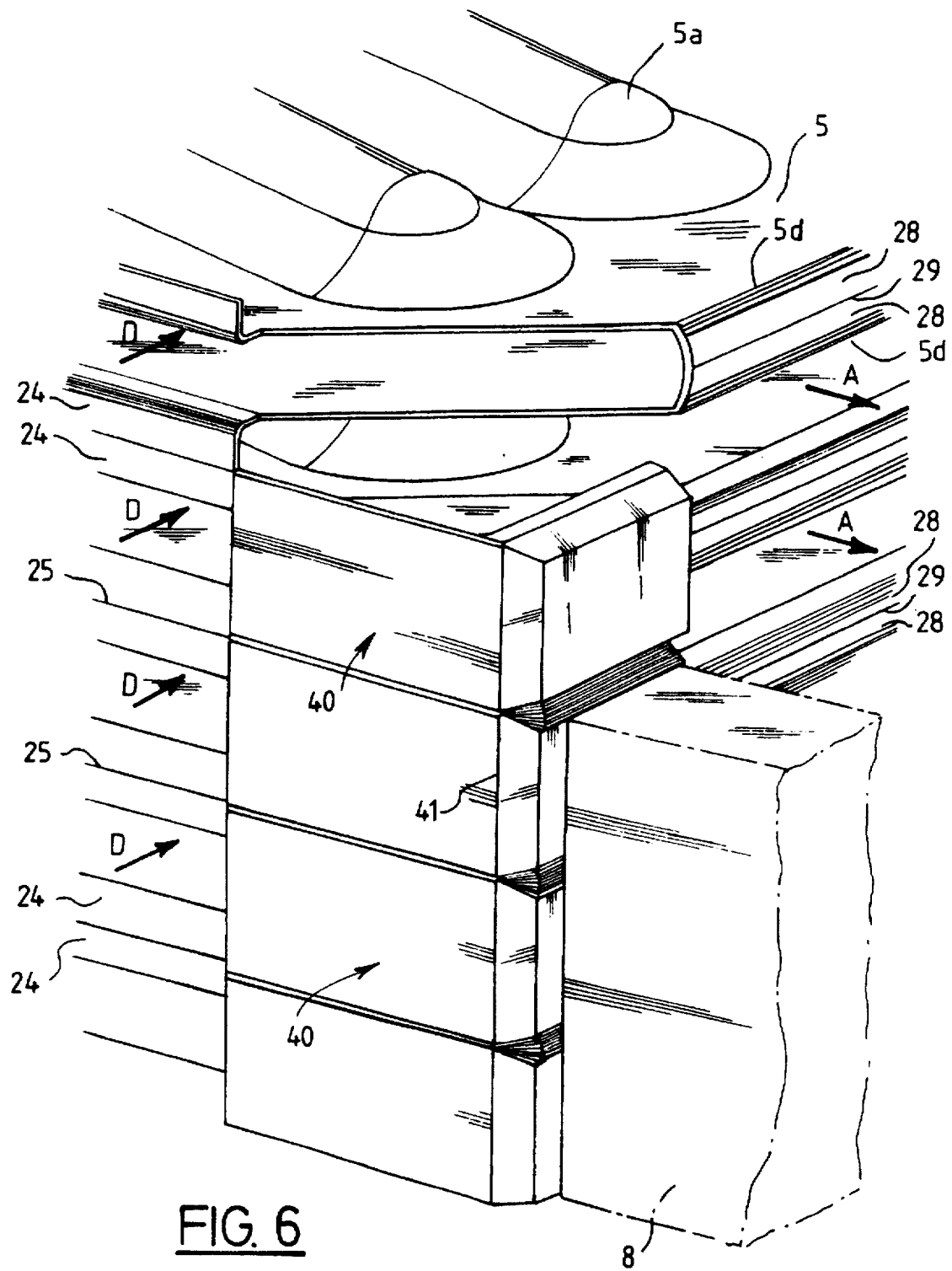
Figure 7:
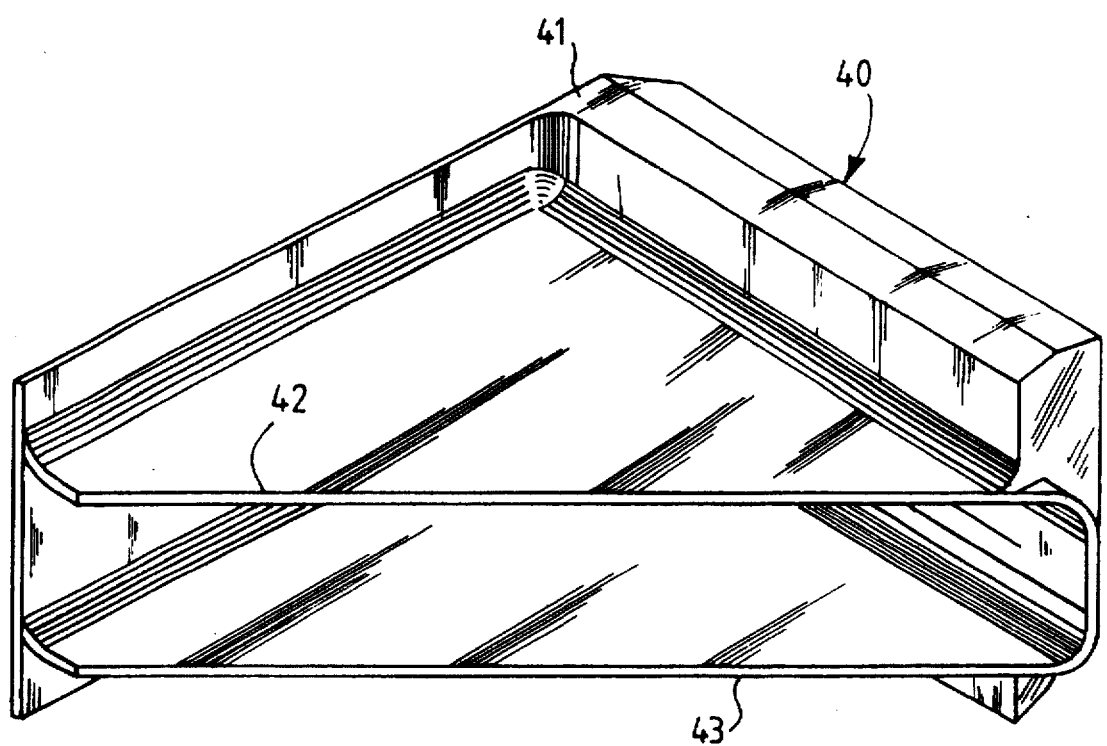

The features and advantages of the invention will become clear during the description which will follow, given merely by way of example and made with reference to the attached drawings, in which:

FIG. 1 is a perspective view with partial cut away of a plate-type exchanger according to the invention, FIG. 2 is a diagrammatic view in longitudinal section of the plate-type exchanger according to the invention, FIG. 3 is a diagrammatic view from above and in perspective partially showing the division between the secondary circuits of the plate-type exchanger according to the invention, FIG. 4 is a perspective view of a dividing member and of a connecting piece, FIG. 5 is a perspective view of a connecting piece, FIG. 6 is a diagrammatic view in perspective and from above partially showing a corner of a plate bundle of the plate-type exchanger of the invention, FIG. 7 is a perspective view of a connecting corner piece.

FIGS. 1 and 2 represent a plate-type heat exchanger intended to carry out heat exchange between a first fluid A consisting of a liquid or gas or a two-phase mixture and N fluids circulating transversely with respect to the first fluid and each consisting of a liquid or a gas or a two-phase mixture.

This heat exchanger is intended, for example, to cool the first fluid A using the N fluids or to heat up this first fluid A.

In the embodiment represented in the figures, the first fluid A is cooled by three fluids B, C and D respectively.

The heat exchanger comprises a leaktight vessel 1 of elongate shape and, for example, of circular section. This leaktight vessel is equipped with feet 2 which are intended to rest on an accepting surface which has not been represented.

Arranged inside the vessel 1 is a plate bundle denoted overall by the reference 3 and of parallelepipedal general shape which constitutes the exchange surface area necessary for the heat transfer between the fluids A, B, C and D.

The leaktight vessel 1 is split into n independent segments, and in the embodiment represented in FIGS. 1 and 2, into three independent segments, 1a, 1b and 1c respectively, by two vertical and parallel partitions 4 joined to the internal wall of the vessel 1 and to the external walls of the plate bundle 3, as will be described later.

The plate bundle 3 is formed, as represented in FIGS. 1, 3 and 6, by a stack of thin metal plates 5 made, for example, of stainless steel, equipped with corrugations 5a.

The plates 5 of the plate bundle 3 are parallel to one another and, in the embodiment represented in the figures, are arranged vertically. These plates 5 may be arranged horizontally.

The plates 5 define gaps between them. One gap in two forms a longitudinal main circuit a for the first fluid A, stretching along the entire length of the plate bundle 3 and the other gaps are divided transversely, in the plane of division of the leaktight vessel 1, that is to say at the partitions 4, in order to form a first secondary circuit b for the fluid B, a second secondary circuit c for the fluid C, and a third secondary circuit d for the fluid D.

The direction of circulation of each secondary fluid B, C and D is perpendicular to the direction of circulation of the main fluid A.

Thus, the plate bundle 3 is divided, in the embodiment represented in FIGS. 1 and 2, into three plate sub-bundles 3a, 3b and 3c respectively, each consisting of a stack of plates 5, the plates of each sub-bundle being joined to the plates situated in the same plane of the adjacent sub-bundle by connecting means which will be described later.

The main circuit a for the first fluid A is joined at one end of the plate bundle 3 to means for letting in the first fluid A and at the opposite end of the said plate bundle 3 to means for letting the said first fluid A out after it has passed through this main circuit.

The means for letting in the first fluid A are formed by a manifold 6 stretching over the entire end section of the plate bundle 3 and connected to a nozzle 7 for letting the first fluid A in, passing in leaktight fashion through the vessel 1.

The means for letting the first fluid A out are formed by a manifold 8 stretching along the entire end section of the plate bundle 3 and connected to a nozzle 9 for letting the said first fluid A out, passing in leaktight fashion through the vessel 1.

According to the embodiment represented in FIGS. 1 and 2, the gaps of the first secondary circuit b for the circulation of the fluid B are divided in order to form two secondary sub-circuits, b1 and b2 respectively, for the circulation of this secondary fluid b in opposite directions.

The inlet of the first sub-circuit b1 emerges directly inside the corresponding segment 1a of the leaktight vessel 1 which has an inlet 10 for the corresponding fluid.

The outlet of the first sub-circuit b1 is joined by a manifold 11 to the inlet of the second sub-circuit b2.

The outlet of the second sub-circuit b2 is joined by a manifold 12 to a nozzle 13 for letting the corresponding secondary fluid B out, passing in leaktight fashion through the vessel 1.

This nozzle 13 is, for example, parallel to the nozzle 7 for letting the first fluid A into the main circuit a of the plate bundle 3.

However, the nozzle 13 may be perpendicular to the nozzle 7 for letting the first fluid A in.

Thus, this arrangement with dual circulation of the second fluid B relative to the first fluid A allows the heat exchange between these two fluids to be increased.

This dual circulation may be carried out with the fluids C and/or D.

The inlet of the second secondary circuit c emerges directly inside the segment 1b of the vessel 1 which has an inlet 14 for the fluid C and the outlet of the second secondary circuit c emerges for example opposite the inlet, directly inside the segment 1b which has an outlet 15 for the fluid C.

The inlet of the third secondary circuit d emerges directly inside the segment 1c of the vessel 1 which has an inlet 16 for the fluid D and the outlet of the third secondary circuit d emerges for example opposite the inlet, directly inside the segment 1c which has an outlet 17 for the fluid D.

The inlets 14 and 16 are, in the embodiment represented in FIGS. 1 and 2, situated at the lower part of the vessel 1 and the outlets 15 and 17 are situated at the upper part of this vessel 1. The converse arrangement is also possible.

Referring to FIGS. 3 to 5, the separation between the secondary circuits b and c will now be described, the separation between the secondary circuits c and d and between the secondary sub-circuits b1 and b2 being identical.

The secondary circuits b and c are separated by I-shaped section pieces 20 parallel to one another and each arranged in a gap in the plate bundle 3 delimiting the said secondary circuits b and c.

Each section piece 20 has a central web 21 and two flanges 22 and 23 which are parallel and are perpendicular to the web 21. The edges of the two flanges 22 and 23 are fixed by linear welds 19 to the transverse edges of the adjacent plates 5 of the bundle 3.

As represented in FIG. 3, each section piece 20 does not extend as far as the longitudinal edges 5b of the plates 5 of the bundle 3 and the portion 5c of each plate 3 which is situated between the longitudinal edge 5b and the section piece 20 forms, with a vertical plane passing through the web 21 of this section piece 20, an angle which is determined for the positioning of a connecting piece 30 which will be described later.

As FIG. 3 represents, each plate 5 has, at the gaps defining the main circuit a, on each of its longitudinal edges 5b, a longitudinal fold 24 arranged facing the fold 24 of the adjacent plate 5. The folds 24 stretch substantially along the entire width of each secondary circuit b, c and d and the free edges of these folds 24 are joined together by a leaktight linear weld 25.

The free ends of the folds 24 are joined to the adjacent end of the section pieces 20 by the connecting piece 30.

As represented in FIGS. 3 to 5, each connecting piece 30 has, on the one hand, a vertical plate 31 and, on the other hand, a box section 35 arranged on the internal face of the vertical plate 31.

The connecting pieces 30 are designed for the thin sheet constituting the plates 5 of the bundle 3 to be welded to them.

The vertical plate 31 has on its lateral edges two opposed rims 32 and 33 respectively, having a profile which corresponds to the profile of the free ends of the folds 24.

The box section 35 is formed of two horizontal and parallel plates 36 and 37 each having the shape of a trapezium, and between which vertical plates 38 and 39 respectively are arranged so as to close the box section 35 completely.

The vertical plate 31 has a height substantially equal to two gaps between plates 5 of the bundle 3 and the height of the box section 35 is substantially equal to the height of one gap.

As is clear in FIG. 3, the rims 32 and 33 of the lateral edges of the vertical plate 31 of each connecting piece 30 are fixed by welding to the free ends of the adjacent folds 24, while the lateral edges of the horizontal plates 36 and 37 are fixed by welding to the inclined edges 5c of the adjacent plates 5 and the end plate 39 of the box section 35 is fixed by welding to the free end of the adjacent section piece 20.

Thus, for each connecting piece 30, the vertical plate 31 covers a gap corresponding to the secondary circuit b, c or d and an upper half-gap and lower half-gap corresponding to the main circuit a.

The longitudinal edges of the vertical plates 31 of the superimposed connecting pieces 30 are therefore contiguous and welded together in such a manner that these connecting pieces form a continuous surface.

These connecting pieces 30 together with the section pieces 20 and the folds 24 of the plates 5 of the bundle 3 make it possible to make the main circuit a and the independent secondary circuits b, c and d leaktight.

The thickness of the flanges 22 and 23 of the section pieces 20 and of the various plates 31, 36, 37, 38 and 39 of the connecting pieces 30 is substantially equal to the thickness of the plates 5 of the bundle 3 so as to ensure continuity of the main circuit a and of each secondary circuit b, c and d.

As represented in FIG. 6, each plate 5 of the bundle 3 has, at the gaps defining the secondary end circuits and on its transverse edges 5d situated at the end of the plate bundle 3, a transverse fold 28 arranged facing the fold 28 of the adjacent plate 5 and the free edges of these folds 28 are joined together by a leaktight linear weld 29. The corners of the plates 5 at the ends of the plate bundle 3 are inclined and joined together by connecting corner pieces 40.

The corner pieces 40 are designed for the thin sheets constituting the plates 5 of the bundle 3 to be welded to them.

As represented in FIG. 7, each corner piece 40 has, on the one hand, a vertical plate 41 in the form of a bracket and, on the other hand, two horizontal and parallel plates 42 and 43 arranged on the internal faces of the two legs of the bracket-shaped vertical plate 41.

Thus, for each corner piece 40, the vertical plate 41 covers a gap corresponding to the secondary circuit b or d and an upper half-gap and a lower half-gap corresponding to the main circuit a.

The lateral edges of each leg of the vertical bracket-shaped plate 41 are contiguous and fixed by welding respectively to the free ends of the adjacent longitudinal folds 24 and to the free edges of the adjacent transverse folds 28 and the free ends of each horizontal plate 42 and 43 are fixed by welding to the edges of the adjacent plates 5 of the bundle 3.

The longitudinal edges of the superimposed corner pieces 40 are welded together to form a continuous corner surface.

Thus, at the ends of the plate bundle 3, leaktightness of the secondary circuits b and d is obtained by virtue of the folds 28, the welds 29 and the corner pieces 40.

The longitudinal folds 24 and transverse folds 28, the section pieces 20, the connecting pieces 30 and corner pieces 40 together with the welds between these various elements make it possible to provide leaktightness between the main circuit a and the secondary circuits b, c and d and between the secondary circuits b, c and d and play a part in providing the whole of the plate bundle 3 with rigidity.

The connecting pieces 30, the corner pieces and the section pieces 20 situated on the edges of the plate bundle 3 allow the partitions 4 to be fixed by welding and also allow the inlet manifold 6 and the outlet manifold 8 for the first fluid A and the manifolds 11 and 12 for guiding the corresponding secondary fluid in the case of a multi-pass circulation of the corresponding secondary fluid to be welded on.

The leaktight casing 1 separates the fluids from one another with the aid of the partitions 4 welded to the periphery of the plate bundle 3 and in leaktight contact, for example, via a circular O ring 4a on the internal wall of the casing 1.

Thus, the plate bundle 3 and the partitions 4 form a rigid assembly which can expand and slide within the casing 1, without generating the mechanical stresses brought about by a thermal expansion differential.

This approach to construction and to assembly makes it possible to place several plate bundles in series in one and the same casing and to obtain a great differential between the inlet temperature of the main fluid and its outlet temperature, while reducing the bulk of the installation.

The casing provides leaktightness to the atmosphere and allows each segment of the plate bundle to be pressurized by the fluid emerging directly in the corresponding segment.

We claim:

1. Plate-type heat exchanger, characterized in that it includes:

a leaktight vessel (1) of elongate shape, and divided transversely into at least two independent segments (1a, 1b, 1c), and a plate bundle (3) arranged in the leaktight vessel (1) and formed by a stack of metal heat-exchange plates (5) which are equipped with corrugations (5a) and define gaps between them, one gap in two forming a longitudinal main circuit a for a first fluid A stretching along the entire length of the plate bundle (3), and the other gaps being divided transversely in the plane of division of the leaktight vessel (1) in order to form at least two secondary and independent circuits b, c and d for the circulation of a second fluid B and at least one third fluid C and D perpendicular to the direction of circulation of the first fluid A.

2. Heat exchanger according to claim 1, characterized in that the leaktight vessel (1) is divided transversely by at least one partition (4) arranged between the internal wall of the said vessel (1) and the external walls of the plate bundle (3).

3. Heat exchanger according to claim 1, characterized in that the main circuit a is joined at one end of the plate bundle (3) to means (6, 7) for letting in the first fluid A and at the opposite end of the said plate bundle (3) to means (8, 9) for letting the said first fluid A out after it has passed through this main circuit.

4. Heat exchanger according to claim 3, characterized in that the means for letting in the first fluid A are formed by a manifold (6) stretching over the entire end section of the plate bundle (3) and connected to a nozzle (7) for letting the first fluid A in, passing in leaktight fashion through the vessel (1).

5. Heat exchanger according to claim 3, characterized in that the means for letting the first fluid A out are formed by a manifold (8) stretching along the entire end section of the plate bundle (3) and connected to a nozzle (9) for letting the said first fluid A out, passing in leaktight fashion through the vessel (1).

6. Heat exchanger according to claim 1, characterized in that at least one secondary circuit b is divided in order to form two sub-circuits b1 and b2 for circulation of the corresponding fluid in opposite directions.

7. Heat exchanger according to claim 6, characterized in that the outlet of the first sub-circuit b1 communicates with the inlet of the second sub-circuit b2 via a manifold (11) for transferring the corresponding fluid B between the two sub-circuits.

8. Heat exchanger according to claim 7, characterized in that the inlet of the first sub-circuit b1 emerges directly inside the corresponding segment (1a) of the leaktight vessel (1) which has an inlet (10) for the corresponding secondary fluid B.

9. Heat exchanger according to claim 7, characterized in that the outlet of the second sub-circuit b2 is joined by a manifold (12) to a nozzle (13) for letting the corresponding secondary fluid B out, passing in leaktight fashion through the vessel (1).

10. Heat exchanger according to claim 1, characterized in that the inlet of the said at least one second circuit c and d emerges directly inside the corresponding segment (1b, 1c) of the leaktight vessel (1) which has an inlet (14, 16) for the corresponding secondary fluid C and D and the outlet of the said at least one second circuit c and d emerges opposite the inlet, directly inside the corresponding segment (1b, 1c) of the leaktight vessel (1) which has an outlet (15, 17) for the corresponding fluid.

11. Heat exchanger according to claim 1, characterized in that the secondary circuits b, c and d are separated from one another by I-shaped section pieces (20) having a central web (21) and two flanges (22, 23) which are parallel and perpendicular to the said web (21) welded to the transverse edges of the adjacent plates (5) of the bundle (3).

12. Heat exchanger according to claim 1, characterized in that each plate (5) of the bundle (3) has, at the gaps defining the main circuit a and on each of its longitudinal edges (5b), a longitudinal fold (24) arranged facing the fold (24) of the adjacent plate (5), the said folds (24) stretching substantially along the entire width of each secondary circuit and the free edges of these folds (24) being joined together by a leaktight linear weld (25).

13. Heat exchanger according to claim 12, characterized in that the free ends of the folds (24) are joined to the adjacent end of the section pieces (20) by a connecting piece (30).

14. Heat exchanger according to claim 13, characterized in that each connecting piece (30) has, on the one hand, a vertical plate (31) and, on the other hand, a box section (35) arranged on the internal face of the vertical plate (31) and formed of two horizontal and parallel plates (36, 37) between which vertical plates (38, 39) are arranged.

15. Heat exchanger according to claim 14, characterized in that the lateral edges of the vertical plate (31) of each connecting piece (30) are fixed by welding to the free ends of the adjacent folds (24), the lateral edges of the horizontal plates (36, 37) are fixed by welding to the edges (5c) of the adjacent plates (5) and the end plate (39) is fixed by welding to the free end of the adjacent section piece (20).

16. Heat exchanger according to claim 14, characterized in that the longitudinal edges of the vertical plates (31) of the connecting pieces (30) are welded together and the said connecting pieces (30) form a continuous surface.

17. Heat exchanger according to claim 1, characterized in that each plate (5) of the bundle (3) has, at the gaps defining a secondary end circuit b and d and on its transverse edges (5d) situated at the end of the plate bundle (3), a transverse fold (28) arranged facing the fold (28) of the adjacent plate (5), the free edges of these folds (28) being joined together by a leaktight linear weld (29).

18. Heat exchanger according to claim 1, characterized in that the corners of the plates (5) at the ends of the plate bundle (3) are joined together by a connecting corner piece (40).

19. Heat exchanger according to claim 18, characterized in that each connecting piece (40) has, on the one hand, a vertical plate (41) in the form of a bracket and two horizontal and parallel plates (42, 43) arranged on the internal faces of the two legs of the bracket-shaped vertical plate (41).

20. Heat exchanger according to claim 18, characterized in that the lateral edges of each leg of the bracket-shaped plate (41) are fixed by welding respectively to the free ends of the longitudinal folds (24) and to the free ends of the adjacent transverse folds (28) and the free edge of each horizontal plate (42, 43) is fixed by welding to the edges of the adjacent plates (5) of the bundle (3).

21. Heat exchanger according to claim 18, characterized in that the longitudinal edges of the bracket-shaped vertical plate (41) of the connecting corner pieces (40) are welded together and the said connecting corner pieces (40) form a continuous corner surface.

* * * * *